US006530144B1

(12) United States Patent
Hong

(10) Patent No.: US 6,530,144 B1
(45) Date of Patent: Mar. 11, 2003

(54) APPARATUS FOR AUTOMATIC ASSEMBLING A HEAT EXCHANGER

(75) Inventor: Jang-Sun Hong, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/593,673

(22) Filed: Jun. 14, 2000

(30) Foreign Application Priority Data

Oct. 27, 1999 (KR) .............................................. 99-46842
Nov. 29, 1999 (KR) .............................................. 99-53475

(51) Int. Cl.$^7$ ................................................. B23P 15/26
(52) U.S. Cl. ....................... 29/726.5; 29/726; 29/33 G; 29/33 T; 29/890.047
(58) Field of Search ............................... 29/726.5, 726, 29/723, 890.043, 890.047, 890.045, 33 G, 33 K, 33 T, 809, 281.1, 281.4, 281.5, 281.6, 282; 221/267, 307, 308, 164; 414/745.3, 745.7

(56) References Cited

U.S. PATENT DOCUMENTS

| | | | | |
|---|---|---|---|---|
| 1,802,929 A | * | 4/1931 | Seelert | |
| 2,154,855 A | * | 4/1939 | Lear | |
| 2,893,599 A | * | 7/1959 | Kay | |
| 3,095,114 A | * | 6/1963 | Tobias | |
| 3,789,479 A | * | 2/1974 | Zifferer et al. | |
| 4,466,555 A | * | 8/1984 | Yarnitsky et al. | |
| 4,584,751 A | * | 4/1986 | Gray et al. | |
| 4,631,813 A | * | 12/1986 | Daniels et al. | |
| 4,698,904 A | * | 10/1987 | Nozawa et al. | |
| 4,839,950 A | * | 6/1989 | Stroup | |
| 5,426,847 A | * | 6/1995 | Honma et al. | |
| 5,680,695 A | * | 10/1997 | Vetter | |
| 5,687,473 A | * | 11/1997 | Tokura | |
| 5,996,217 A | * | 12/1999 | Tokunaga et al. | |

* cited by examiner

Primary Examiner—Gregory M. Vidovich
Assistant Examiner—T. Nguyen
(74) Attorney, Agent, or Firm—Robert E. Bushnell, Esq.

(57) ABSTRACT

An automatic assembling apparatus for inserting hair pins into holes formed on a heat exchanger including a plurality of flat plate fins and two side panel disposed both sides of said flat plate fins are provided. The apparatus includes a working station on which the heat exchanger are arranged, a hair pin guiding unit installed on the working station and located one side of the heat exchanger by a predetermined distance from one side of the working station for being inserted through the holes and penetrated the heat exchanger and correspondingly contacted with openings of the hair pins while protruding from the other side of the heat exchanger, a hair pin pushing unit installed at the opposite side to the hair pin guiding unit in a predetermined interval at the other side of the working station, with the heat exchanger being placed between the hair pin guide means and the hair pin push means, for pushing and inserting the hair pins into the heat exchanger through the holes while the hair pin guiding unit contact the opening of the hair pin and retracted from the heat exchanger through the holes, a heat exchanger clamping unit installed at both sides of the heat exchanger for clamping both sides of the heat exchanger placed on the working station, and a hair pin supporting unit installed between the heat exchanger and the hair pin pushing unit on the working station for accurately positioning the hair pins.

34 Claims, 5 Drawing Sheets

APPARATUS FOR AUTOMATIC ASSEMBLING A HEAT EXCHANGER

CLAIM OF PRIORITY

This application makes reference to, incorporates the same herein, and claims all benefits accruing under 35 U.S.C. §119 from applications for AUTOMATIC DEVICE FOR INSERTING HAIR PINS OF HEAT EXCHANGER earlier filed in the Korean Industrial Property Office on Oct. 27, 1999 and there duly assigned Serial No. 46842/1999, and for AUTOMATIC DEVICE FOR INSERTING HAIR PINS OF HEAT EXCHANGER earlier filed in the Korean Industrial Property Office on Nov. 29, 1999 and there duly assigned Serial No. 53475/1999.

BACKGROUND OF THE INVENTION

1. Field of the Invention

The present invention relates to an apparatus for automatic assembling a heat exchanger, and more particularly to an apparatus for automatic assembling a plurality of hair pins and a plurality of flat plat fins of a heat exchanger.

2. Brief Description of the Prior Art

A plurality of flat plate fins and a plurality of hair pins are used for a heat exchanger. The flat plate fins are spaced-apart from each other by a predetermined distance to allow air to pass between the spaced-apart flat plate fins. The air becomes cool or heated during passing through a space between the spaced-apart flat plate fins. A plurality of hair pins are inserted into a plurality of holes formed on the flat plate fins. Coolant flowing through the hair pins affects the heat energy of the spaced-apart flat plate fins. Heat energy is transferred between the air and the flat plate fins. In order to insert the hair pins into the holes of the spaced-apart flat plate fins, all of the holes are arranged to fit the hair pins and disposed to accommodate the insertion of the hair pins during assembling the hair pins and the spaced-apart flat plate fins. However, it is very difficult to assemble hair pins and the flat plate fins because of misalignment of the holes and the flat plate fins. Hair pins are bent and dented while being inserted into the misaligned holes of the flat plate fins. The deformation of the hair pins affects the flow of the coolant flowing through the hair pins and lowers the efficiency of the heat exchange.

In conventionally assembling of a heat exchanger as shown in FIG. 1, first and second side panels 10a and 10b are arranged in parallel and spaced apart by a first predetermined interval at both sides of heat exchanger. A plurality of flat plate fins 12 are disposed between first and second side panels 10a and 10b, arranged in parallel, and spaced-apart from each other by a second predetermined interval to allow an air flow to be formed between spaced-apart flat plate fins 12. A plurality of hair pins 14 are arranged in a perpendicular direction of planes of first side panel 10a, flat plate fins 12 and the second side panel 10b and inserted into corresponding holes 18 formed on first and second side panels 10a and 10b and flat plate fins 12. Hair pins 14 coupled to first side panel 10a, flat plate fins 12 and the second side panel 10b as one assembly support the assembly. Coolant flows through the hair pins after a plurality of return bends 16 are coupled to a corresponding pairs of hair pins 14 and sealed with each opening 14a formed at both ends of hair pins 14.

In order to assemble hair pin tubes 14 (i.e., "hair pins" 14) and flat plate fins 12, holes 18 formed on the plane surfaces of first and second side panels 10a and 10b and flat plate fins 12 are arranged and aligned in predetermined height and interval for allowing a pair of openings 14a of hair pins 14 to be inserted into a pair of holes 18. In addition, because each of a plurality of hair pins 14 is shaped with a bent portion 14b in the middle of the total length of hair pin 14, straight portions 14c of hair pin 14 should be kept in parallel. The distance between openings 14a should be same as the distance between end portions 16a of return bends 16 in order to precisely connect end portions 16a of return bends 16 to openings 14a of hair pin 14 after hair pin 14 has been inserted through holes 18 of first and second side panels 10a and 10b and flat plate fins 12. The hair pins 14, however, are deformed after being assembled with first and second side panels 10a and 10b and flat plate fins 12 because of the lack of the accurate and precise alignment of the first and second side panels 10a and 10b and flat plate fins 12.

Reference numeral 20 indicates a plurality of moving units used for arranging first and second side panels 10a and 10b and a plurality of flat plate fins 12 in a predetermined interval and carrying and locating first and second edge panels 10a and 10b and a plurality of flat plate fins 12 on a following assembling line, and manually assembling hair pins 14 and first and second side panels 10a and 10b and a plurality of flat plate fins 12. Each of moving units 20 includes a block 22 like a holding knob and a pair of insertion rods 24 symmetrically fixed in a predetermined interval at one side of the block 22. Moving units 20 are temporarily inserted through holes 18 in order to carry first and second side panels 10a and 10b and a plurality of flat plate fins 12 to the assembling line. Moving units 20 are separately manufactured and assembled temporarily through holes 18. When a predetermined number of hair pins 14 are inserted through holes 18 of the flat plate fins 12, moving units 20 are removed from the flat plate fins 12. A pair of hair pins are inserted into holes into which moving units 20 have been manually inserted and from which moving units 20 has been manually removed.

The conventional method of manually inserting hair pins 14 into first and second side panels 10a and 10b and flat plate fins 12 causes the inefficiency of the assembling process and prevents a mass production of the heat exchanger. Furthermore, an internal diameter of holes 18 and an external diameter of opening 14a of hair pins 14 are rubbed against each other during manually inserting hair pin 14 into holes 18 to cause opening 14a to be deformed and the diameter of opening 14a to be changed. Therefore, the diameters of hair pin 14 does not become uniformed, and the opening 14a of hair pins 14 does not fit each of return bends 16.

SUMMARY OF THE INVENTION

It is an object of the present invention to provide a heat exchanger assembling apparatus suitable to a mass production and an automatic assembly of a heat exchanger.

It is another object of the present invention to provide a heat exchanger assembling apparatus able to automatically and simultaneously assemble a plurality of flat plate fins and a plurality of hair pins.

It is yet another object to provide a heat exchanger assembling apparatus able to align flat plate fins and hair pins.

It is still another object to provide a heat exchanger assembling apparatus able to prevent deformation of hair pins during insertion of hair pin into holes formed on flat plate fins. It is a further object to provide a heat exchanger assembling apparatus able to maintain hair pins without being dented and bent during assembly of hair pins and the flat plate fins.

It is also object to provide a heat exchanger assembling apparatus able to prevent the deterioration of the coolant flow and lowering the efficiency of heat exchange.

These and other objects may be achieved by providing a heat exchanger assembling apparatus including a working station on which a heat exchanger with first and second edge panels and a plurality of flat plate fins is seated, a heat exchanger clamp unit installed at both sides of the heat exchanger for clamping both sides of the heat exchanger placed on the working station, a hair pin guiding unit located at one side of the heat exchanger and in a predetermined distance from one side of the working station and having a plurality of guiding rods being inserted through a plurality of holes formed on the flat plate fins and protruding from the other side of the heat exchanger through the holes so as to correspondingly opening in hair pins located on the other side of the heat exchanger, a hair pin pushing unit installed at the other side of the heat exchanger on the opposite side of the hair pin guiding unit of the working station, with the heat exchanger being placed between the hair pin guides and the hair pin push unit, and pushing and inserting the open end portions of a predetermined number of hair pins through the holes, and hair pin guide plates installed between both the heat exchanger and the hair pin pushing unit on the working station for accurately positioning a predetermined number of hair pins.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
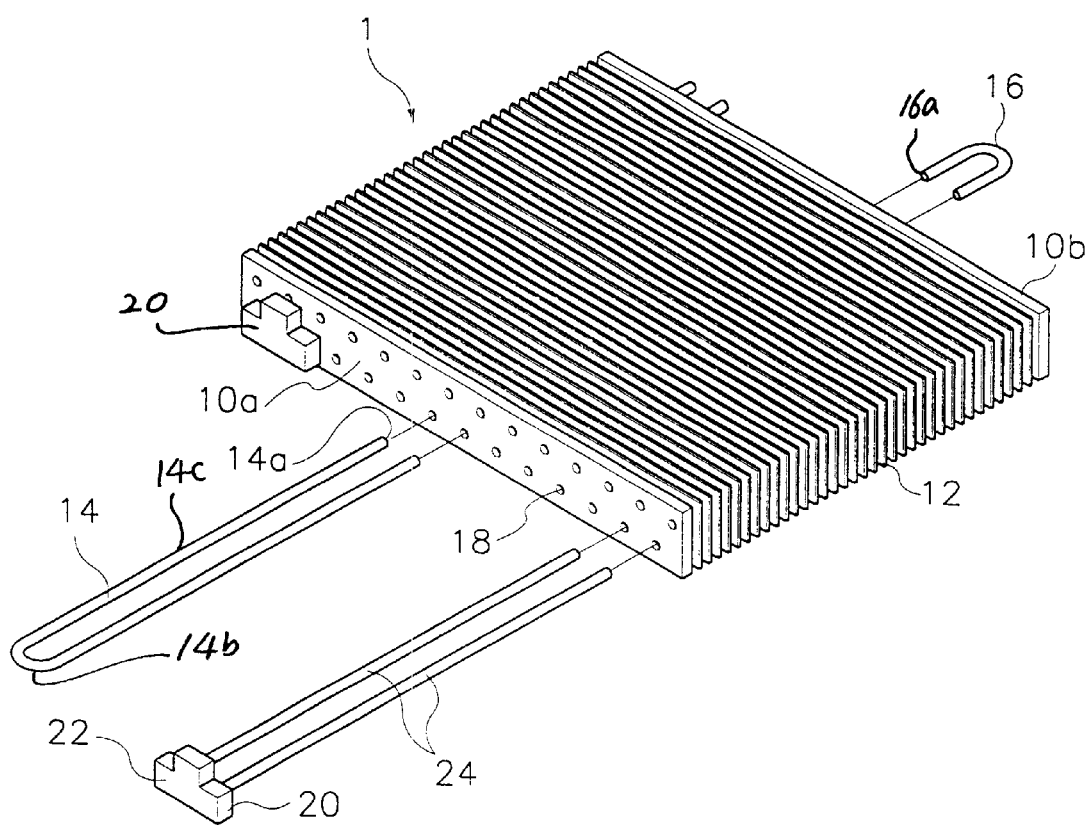
FIG. 1 is a perspective view showing a manual assembly of flat plate fins and hair pins according to prior art.

Hereinafter an embodiment according to the principle of the present invention will be described in detail with reference to accompanying drawings. It should be noted that the same or similar reference numerals of the prior art are used for the same or similar parts in the drawings of the present invention and the detailed descriptions for those parts will be omitted.

Figure 2:
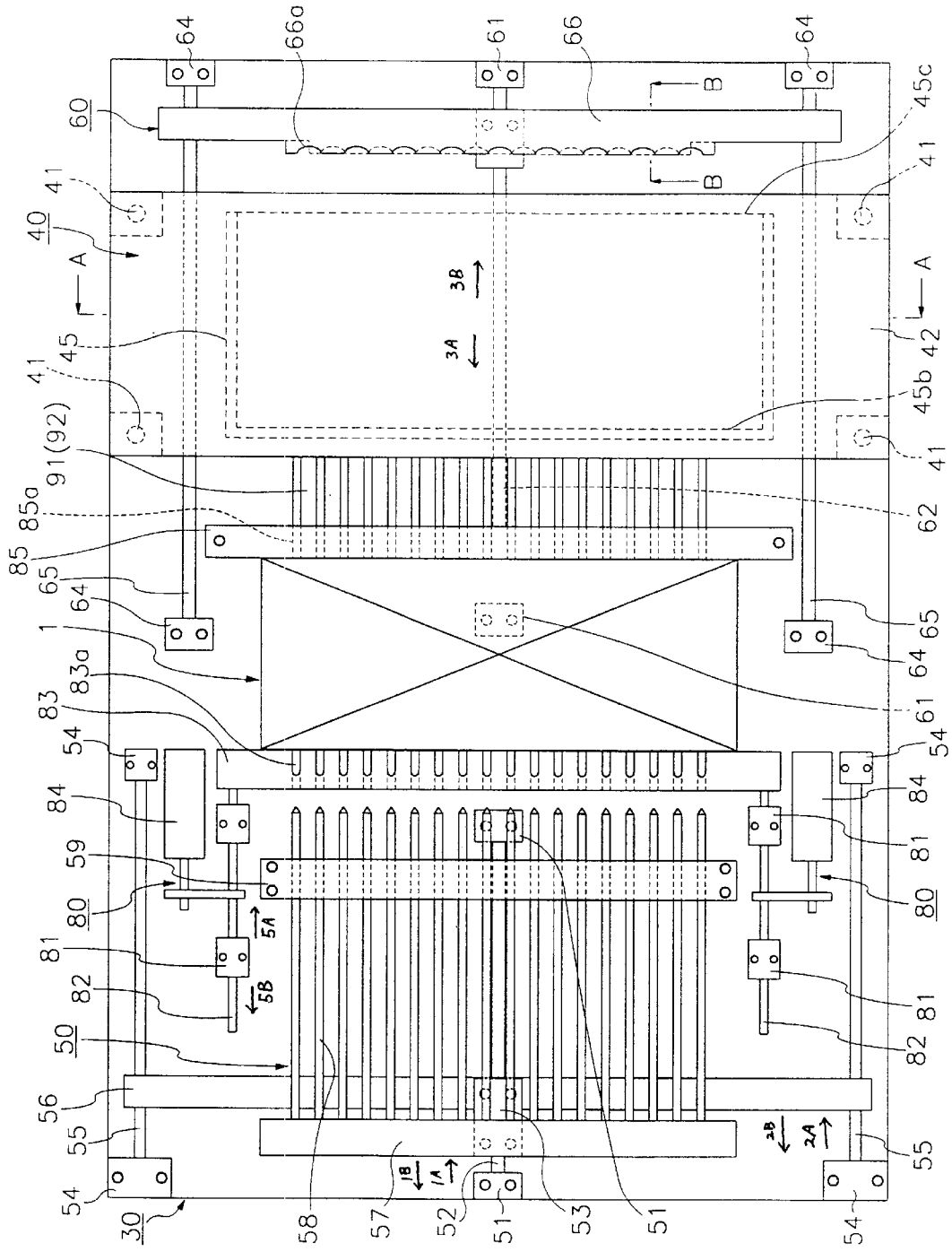
FIG. 2 is a plan view illustrating an automatic assembling apparatus of assembling hair pins and flat plate fins of a heat exchanger according to the principle of the present invention.
Figure 3:
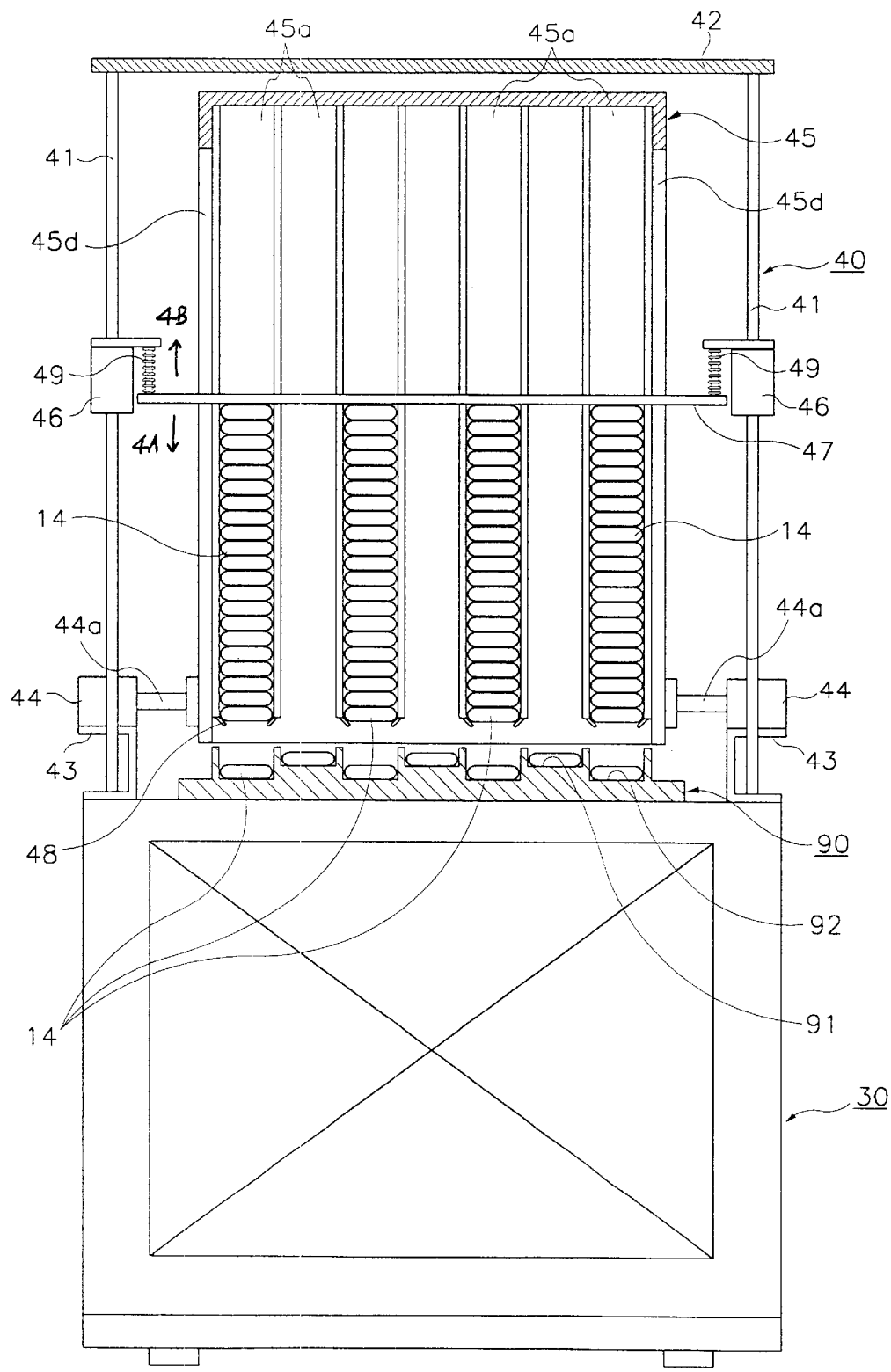
FIG. 3 is a cross-sectional view taken along line A—A in FIG. 2.
Figure 4:
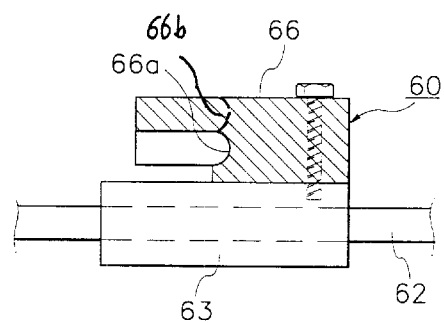
FIG. 4 is a cross-sectional view taken along line B—B in FIG. 2.

Referring now to FIGS. 2 and 3, automatic heat exchanger assembling apparatus includes a working station 30 arranging first and second side panels 10a and 10b and a plurality of flat plate fins 12, a hair pin supplying unit 40 mounted above working station 30 and accumulating a plurality of hair pins 14 and supplying a predetermined quantity of hair pins 14, a hair pin guiding unit 50 installed on an upper end of working station 30 and disposed at one side of the heat exchanger 1 to insert guide rod 58 through a plurality of through holes 18 horizontally formed on each of the rows of the heat exchanger 1 and contact a corresponding opening 14a of a plurality of hair pins 14, a hair pin pushing unit 60 disposed at the opposite side of the heat exchanger 1 and pushing hair pin 14 into holes 18 while guide rod 58 contacts opening 14a, a heat exchanger clamp unit 80 installed between hair pin guiding unit 50 and hair pin supplying unit 40 and clamping both sides of heat exchanger 1 placed on the working station 30; and a hair pin guide plate 90 disposed between a lower portion of an accumulating container 45 of hair pin supplying unit 40 and working station 30 and between heat exchanger 1 and hair pin pushing unit 60 and having a plurality of guide grooves precisely positioning a predetermined number of hair pins 14 into two rows.

Hair pin supplying unit 40 as shown in FIG. 3 includes a plurality of supplying unit rails 41 vertically fixed at predetermined positions on left and right sides of working station 30 and maintaining the two edges in the same height, a top panel 42 fixed on rails 41 for keeping supplying unit rails 41 in a vertical direction and parallel, a pair of first cylinders 44 fixed via a bracket 43 on the lower portion of supplying unit rails 41 at both sides of working station 30, an accumulating container 45 having left and right lower ends coupled with rods 44a of cylinders 44 and a plurality of first and second vertical spaces 45a accommodating hair pins 14 in a vertical direction, a pair of second cylinders 46 respectively assembled on supplying unit rails 41 and moving up and down, a push pad 47 having left and right ends being horizontally connected with second cylinders 46 and sequentially pushing down hair pins 14 accommodated in spaces 45a and positioned at the bottom of the accumulating container 45, and pairs of elastic members 48 formed at the lower open portion of spaces 45a in accumulating container 45 and supporting hair pins 14 accumulated in spaces 45a by elastic force and preventing a drop of each hair pin 14 by gravity. Elastic members 48 are slanted and have an angle with respect to spaces 45a and a dropping direction of hair pins 14 in order to maintain the elastic force, hold hair pins accumulated in spaces 45a, and release hair pins.

By actuating first cylinders 44, rods 44a connected to first cylinders 44 reciprocally move to align spaces 45a and guide grooves 91 and 92 depending on movement of accumulating container 45 in left or right directions. Accumulating container 45 includes a wall 45b attached to one side of accumulating container 45 and being vertically set up to face heat exchanger 1 and an open portion 45c formed on the other side of accumulating container 45, located on the opposite side of wall 45b within accumulating container 45, receiving hair pins 14 in the accumulating container 45, and allowing hair pin pushing unit 60 to push hair pin 14 located on guide grooves 91 and 92, and a pair of slots 45d vertically formed at left and right sides of accumulating container 45 and maintaining push pad 47 in horizontal balance during moving. Push pad 47 penetrates through a slot 45d formed at a left side of accumulating container 45 and allowing both ends of push pad to be connected via cushioning members 49 with a pair of the second cylinders 46.

Figure 5:
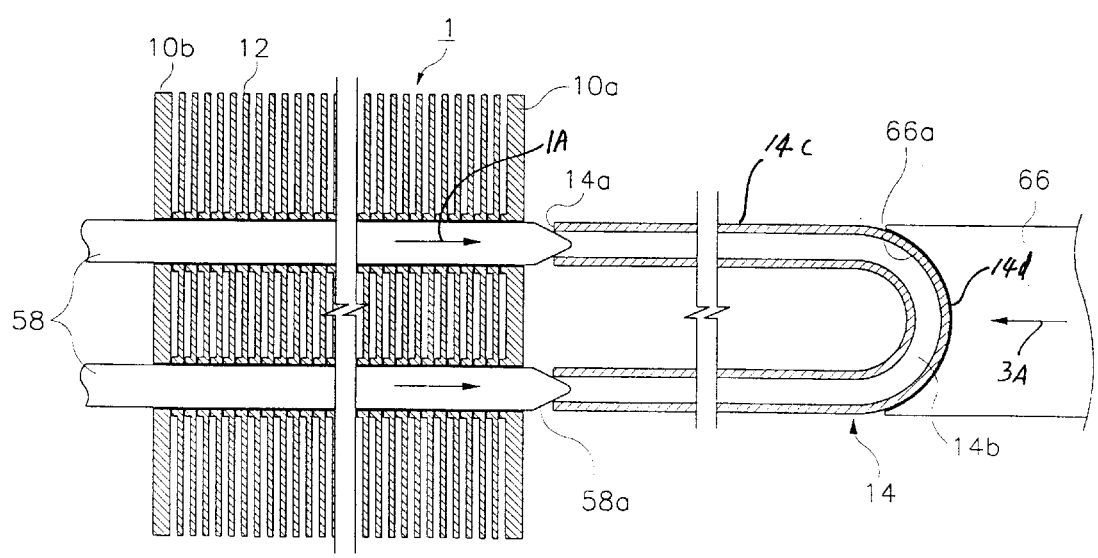
FIG. 5 is a plan cross-sectional view illustrating an assembling process attaching of a guide rod to a hair pin through a hole of a heat exchanger according to the principle of the present invention.

Hair pin guiding unit 50 as shown in FIG. 2 includes a first rail 52 fixed via a pair of brackets 51 to both ends of hair pin guiding unit 50 spaced-apart from each other by a predetermined distance on working station 30, a pair of second rails 55 with two ends fixed via a pair of brackets 54 to both sides of working station 30 and spaced-apart by a predetermined horizontal distance, a connecting member 56 slidably mounted on both second rails with proper balance, a third cylinder 53 coupled to an outer threaded portion of first rail 52, disposed to horizontally move along first rail 52 when activated, fixed to a middle portion of connecting member 56, a moving member 57 having a middle portion connected at the other end of third cylinder 53 and horizontally moving along first guide rail 52 with third cylinder 53 in a direction of arrows 1A and 1B, a pair of upper and lower guide rods 58 horizontally fixed to one side of moving member 57 and spaced-apart by a predetermined interval between front and rear sides and between upper and lower sides, and guide rods 58 inserted through a plurality of holes 18 horizontally formed in two rows in perpendicular to the side of the heat exchanger 1. Each tip 58a formed on an end portion of upper and lower guide rods 58 as shown in FIG. 5 have a shape of a cone with an external diameter of which the center corresponds to the center of the opening 14a of hair pin 14 when inserted into hair pin 14 through opening 14a by a predetermined distance.

Hair pin pushing unit 60 as shown in FIG. 2 includes a third rail 62 fixed via a pair of brackets on both ends with a predetermined distance from a middle portion of the other right side of working station 30, a fourth cylinder 63 connected to an outer peripheral threaded portion of the third rail 62 and horizontally moving along the third rail 62, a pair of fourth rails 65 fixed via a pair of brackets 64 on front and rear ends at a predetermined distance from edges of the other side of working station 30, and a push rod 66 having a middle portion fixed at one end of the fourth cylinder 63 with both ends coupled to an outer peripheral threaded portion of the fourth rails 65 and horizontally moving along the fourth rails 65 by activation of the fourth cylinder 63. Pushing grooves 66a of push rod 66 simultaneously contact bent portions 14b of a predetermined number of hair pins 14 disposed in a predetermined interval and in two horizontal rows on hair pin guiding plate 90 and simultaneously push all the hair pins 14 toward holes 18 after guide rods 58 contact corresponding opening 14a of hair pin 14. As shown in FIG. 5, a plurality of pushing grooves 66a are vertically positioned at a predetermined interval along two horizontal rows of push rod 66 and correspondingly matched with the external shape 14d of bent portion 14b of hair pins 14.

Heat exchanger clamp unit 80 as shown in FIG. 2 includes a pair of brackets 81 fixed at working station 30 at a predetermined interval, a pair of fifth rails 82 supported by brackets 81 for sliding to a direction of arrows 5A and 5B, a moving member 83 fixed at one right end of the fifth rails 82 for horizontally moving and clamping or releasing heat exchanger 1 positioned on the working station 30; a pair of brackets 81 fixed at working station 30 at a predetermined interval and supporting a pair of cylinders 84 fixed at a predetermined portions of the fifth rails 82 for horizontally moving along the fifth rails 82; and a fixing member 85 fixed at one side of the working station 30 and supporting the one side of the heat exchanger 1 when moving member 83 pushing heat exchanger 1 against fixing member 85. A pair of holes 83a and 85a are formed at upper and lower ends and accommodate the insertion of a pair of guide rods 58.

The upper and lower guide grooves 91 and 92 of hair pin guide plate 90 as shown in FIGS. 2 and 3 are corresponding to each pair of a plurality of holes 18 positioned at a predetermined interval in two horizontal rows of upper and lower ends on the side of the heat exchanger 1. Guide grooves 91 and 92 are serially formed in turns along the horizontal direction of the hair pin guide plate 90.

According to the principle of the present invention, operations and effects of the embodiments will be described hereinafter. First and second side panels 10a and 10b and a plurality of flat plat fins 12 are arranged moved with moving units 20 between moving member 83 and fixing member 85 of heat exchanger clamping unit 80 installed on the upper surface of working station 30. Moving unit 20 is detached and removed from first and second side panels 10a and 10b and flat plate fins 12.

When a pair of cylinders 84 are activated and driven by a controller(not shown), the fifth rail 82 moves in a direction of an arrow 5A along with the driving of cylinders 84 and simultaneously moves moving member 83 against heat exchanger 1. Thus, heat exchanger 1 is securely fastened and firmly supported between moving member 83 and fixing member 85. Meanwhile, a plurality of hair pins 14 are accumulated through open portion 45c in a plurality of accommodating grooves 45a formed inside the accumulating container 45. Hair pins 14 accumulated in spaces 45a are kept inside of spaces 45a by elastic members 48. If a pair of the second cylinders 46 assembled at the side of hair pin supplying unit 40 move in a direction of an arrow 4A, second cylinders 46 push down the push pad 47 at a predetermined height while keeping the push pad in parallel along the fourth rails 41. Hair pin 14 of each row is pushed out against elastic member 48, drops down from space 45a, and is horizontally positioned at the lower portion of guide groove 91 and 92 of hair pin guide plate 90 installed by a predetermined distance from the bottom of the accumulating container 45 on the working station 30. Push pad 47 applies a predetermined pressure to each row of hair pins 14 accumulated in spaces 45a of accumulating container 45. The application of the predetermined pressure on the row of hair pins located on each space 45a allows only one hair pin 14 located at a bottom of each space 45a to push out elastic member 48 and drop out from space 45a to guide groove 91 and 92. Elastic member 48 supports the other hair pins contained in space 45 after releasing the one hair pin 14 from space 45a. The remaining hair pins 14 can not pass through the elastic members 48 due to the elastic force and stay inside space 45a. When moving down along with second cylinders 46, push pad 47 indirectly receives force via cushioning member 49 inserted between second cylinder 46 and push pad 47 so that no instant impact or heavy pressure is applied to hair pins 14 contained in spaces 45a. Push pad 47 moves in the direction of arrow 4B when hair pins is supplied into space 45a of accumulating container 45.

After the one row of hair pins 14 are accurately placed on lower guide groove 92 of hair pin guide plate 90, the accumulating container 45 moves to a predetermined position by means of the motion of a pair of the first cylinders 44 installed on lower external sides of accumulating container 45. When accumulating container 45 moves in a left or right direction by the activation of first cylinders 44, the other upper guide groove 91 of hair guide plate 90 and spaces 45a of the accumulating container 45 are matched at the same vertical line. Upper guide groove 91 receives another row of hair pins 14 contained in the spaces 45a in the same manner as one row of hair pins 14 are accurately placed in lower guide groove 92.

If the fourth cylinder 63 fixed on the side of the hair pushing unit 60 is driven as shown in FIG. 2, the fourth cylinder 63 is guided by the third rail 65 and moves in a direction of arrow 3A or 3B along the third rail 62. Push rod 66 fixed on the fourth cylinder 63 is shifted to the same direction of movement of the fourth cylinder 63. Push rod 66 is movably supported by the fourth rails 65 installed at the front and rear ends of the working station 30. The entire push rod 66 is well-balanced while moving with constant speed along the fourth rail 65 by fourth cylinder 63.

Push rod 66 includes two horizontal rows of pushing grooves 66a and 66b, and each pushing groove 66a or 66b is alternatively located in the horizontal plane of push rod 66. When push rod 66 moves in the direction of arrow 3A by the fourth cylinder 63, pushing grooves 66a and 66b contact outer surface 14d of bent parts 14b of hair pins 14 accurately positioned at a pair of upper and lower guide grooves 91 and 92 formed at the hair pin guide plate 90 and simultaneously moving a plurality of hair pins 14 engaged with pushing grooves 66a and 66b.

A curved portion of pushing grooves 66a and 66b formed at the end of the push rod 66 contacts bent part 14b of hair pins 14 to uniformly push hair pins 14 by receiving equal force to prevent bent part 14b from deforming hair pin 14.

If the third cylinder 53 located on the side of hairpin guiding unit 50 moves as shown in FIG. 2, the third cylinder 53 is guided by the first rail 52 and moved in the direction of arrow 1A, and connecting member 56 and moving member 57 respectively fixed at upper and lower surface of the third cylinder 53 simultaneously move in the direction of arrow 1A.

Since connecting member 56 is movably supported by second rails 55 of which the two ends are respectively installed at front and rear ends of working station 30, the entire connecting member 56 is kept in balance while moving at the same speed. Connecting member 56 balances the entire moving member 57 fixed on the upper surface of the third cylinder 53 while moving.

As shown in FIG. 2, a pair of upper and lower guide rods 58 positioned at the right side of moving member 57 at a predetermined interval and forming two horizontal rows simultaneously move to allow tip 58a having a shape of cone to pass through a plurality of holes 83a formed on moving member 83 of the heat exchanger clamping unit 80 and further pass through a plurality of holes 18 formed in two horizontal rows perpendicular to the lateral side of the heat exchanger 1. As a result, only a predetermined portion of the guide rod 58 including tip 58a is inserted through holes 18 formed on one side of heat exchanger 1 and passes through the heat exchanger, protrudes from the other side and the opposite side of the one side of heat exchanger 1, and then contacts the open ends 14a of hair pins 14 accurately positioned in two horizontal rows at the upper and lower guide grooves 91 and 92 of hair pin guide plate 90.

Since the maximum external diameter of the tip 58a is larger than the internal diameter of opening 14a formed at one end of hair pin 14, only a portion of the tip 58a is inserted into opening 14a. Depending on the diameter of the tip and guide rod 58, a portion of guide rod 58 can be inserted into the inside of hair pin 14. The tip 58a is not fully inserted by being hitched at the external circular side in the middle of the tip 58a but tightly attached to together. Therefore, the horizontal length of a pair of guide rods 58 and hair pins 14 is kept all the same in parallel, and hair pin 14 and through hole 18 are sealed for preventing foreign material from entering through opening 14a without any deformation at the circular end of opening 14a which maintained to be suitable to insertion of return bend 16.

Figure 6:
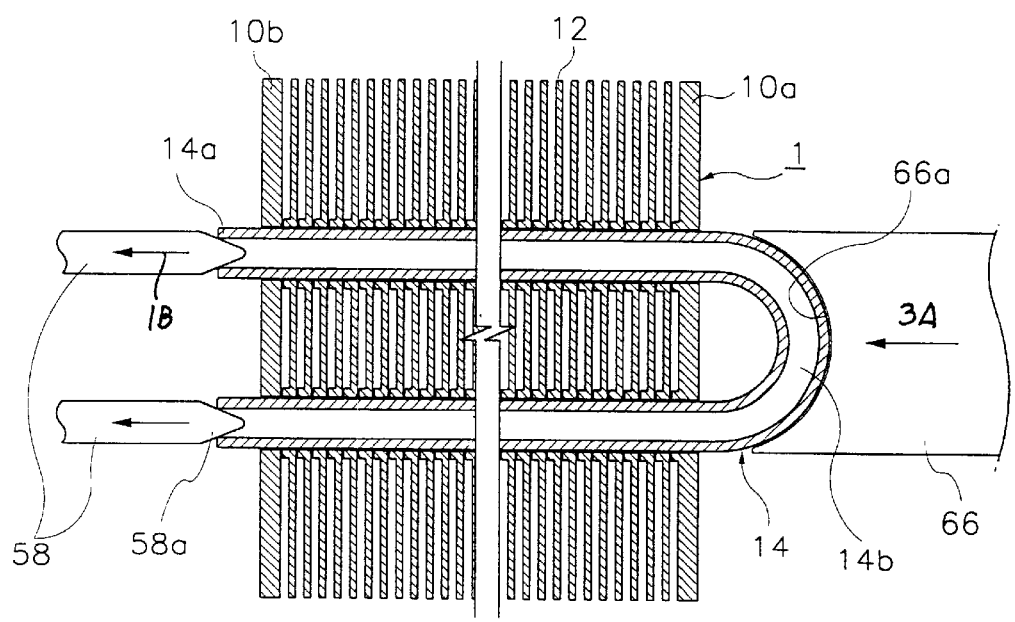
FIG. 6 is a plan sectional view illustrating the assembling process for inserting of hair pins through though holes of a heat exchanger with a pushing block according to the principle of the present invention.
Figure 7:
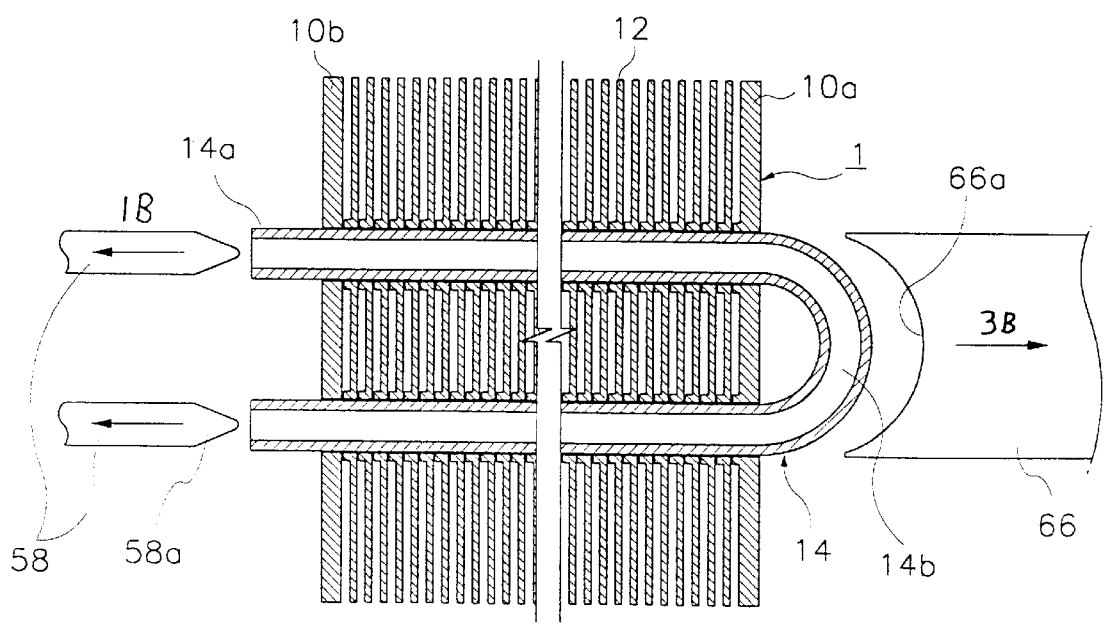
FIG. 7 is a plan sectional view illustrating the assembling process for detaching the guide rod and the pushing block from a hair pin according to the principle of the present invention.

As shown in FIG. 5, while a pair of pushing grooves 66a of push rod 66 is tightly contacted with bent part 14b, and opening 14a of hair pin 14 is tightly attached to tip 58a of upper and lower guide rods 58, push rod 66 moves in the direction of arrow 3A and the upper and lower guide rods 58 moves in the direction of arrow 1B. Hair pins 14 inserted between push rod 66 and upper and lower guide rods 58 move toward heat exchanger 1, and opening 14a of hair pin 14 is sequentially inserted through holes 18 of the first side panel 10a, flat plate fins 12, and second side panel 10b. Thus, as shown in FIG. 6, a predetermined number of hair pins 14 are simultaneously assembled.

After a plurality of hair pins 14 are assembled to the heat exchanger 1 having the first and second side panels 10a and 10b and flat plat fins 12 as shown in arrows 1B and 3B respectively: a pair of upper and lower guide rods 58 move in the direction of the arrow 1B along with the movement of the third cylinder 53 to thereby return to the original position. Tip 58a of guide rod 58 and opening 14a of hair pin 14 are detached apart, and push rod 66 returns to its original position along with the movement of the fourth cylinder 63 so that pushing grooves 66a of push rod 66 and bent part 14b of hair pin 14 are detached apart. After first and second side panels 10a and 10b and flat plate fins 12 are sequentially assembled with hair pins 14, heat exchanger clamping unit 80 releases heat exchanger 1 in the reverse sequence of the assembly. Heat exchanger 1 is moved to a next assembly step in which hair pins 14 and return bends 16 are assembled together.

As described above, there are advantages in the automatic device for inserting hair pins of the heat exchanger of the present invention in that the device is constructed for automatically and simultaneously inserting a plurality of hair pins through a plurality of through holes formed on the first and second edge panels and flat plat fins, thereby eliminating workers' fatigue and deformation defects in manual assembly of hair pins one after another and reducing time in assembly to achieve mass production.

What is claimed is:

1. An automatic heat exchanger assembling apparatus, comprising:

a working station;

a clamping unit installed on said working station, having a fixing member fixed on said working station and a moving member moving against said fixing member to maintain a plurality of flat plate fins perforated by a plurality of holes arranged in a configuration, located between said fixing and moving members and clamped on said working station by said moving member pushing against said fixing member;

a container disposed on a first side of said clamping unit, accommodating a plurality of hair pins each having two open ends coupled together by a bent portion, with the hair pins arranged in said container in a geometric construct comprised of a plurality of distinct rows of the hair pins, and discharging the hair pins by ejecting the hair pins seriatim from each of said rows in conformance with said configuration;

a guide plate oriented to receive the hair pins ejected from said container in array in an alignment with said configuration, with said guide plate maintaining the hair pins ejected with an orientation corresponding to said configuration of the holes;

a hair pin guiding unit disposed on a second side of said clamping unit, having a plurality of guide rods moving between a first position and a second position, said guiding unit inserting said guide rods into said flat plate fins through corresponding ones of the plurality of holes formed on the flat plate fins while moving from said first position to said second position, penetrating the flat plate fins through the holes, protruding from the other side of the flat plate fins through the holes, contacting corresponding ends of the hair pins arranged on said second side of said flat plate fins in said second position; and a hair pin pushing unit disposed on a first side of the clamping unit, having a plurality of push rods each contacting a corresponding bent portion of different ones of the hair pins located between said hair pin pushing unit and the flat plate fins and simultaneously pushing said corresponding bent portion of the hair pins against the flat plate fins while said guide rods in said second position contact said corresponding ends of the hair pins, inserting said open ends of the hair pins into corresponding holes of said flat plate fins by pushing the hair pins against the flat plate fins and simultaneously moving said guide rods from said second position to first position.

2. The apparatus of claim 1, further comprised of a hair pin positioning unit located between said hair pin pushing unit and said flat plate fins, supporting and positioning the hair pins while said hair pin is inserted into said holes by said hair pin pushing unit.

3. The apparatus of claim 1, with said container comprising an elastic member formed on a bottom of each said row, holding the hair pins in said row, while preventing the hair pins from dropping by gravity from said rows without an external force.

4. The apparatus of claim 3, with said container comprising a push pad disposed on top of the hair pins in each of said rows, applying pressure on the hair pins to allow one of the hair pins disposed at a bottom of each of said rows to be released seriatim from said elastic member.

5. The apparatus of claim 1, with said hair pin guiding unit comprising a tip formed on one end of said guide rods, said tip inserted into the open ends of the hair pins while the guide rods moving between said second position and said first position.

6. The apparatus of claim 1, with said hair pin guiding unit comprising a tip formed on one end of said guide rods, said tip having a shape of a cone, a top portion of said tip being inserted into open ends of the hair pins while a bottom portion of said tip is not inserted into open ends of said hair pins.

7. The apparatus of claim 1, with said guide rods of said hair pin guiding unit having a diameter smaller than a diameter of corresponding holes in the flat plate fins.

8. The apparatus of claim 1, with said push rod of said hair pin pushing unit comprising a pushing groove having the same shape of a bent portion of the hair pins.

9. An automatic heat exchanger assembling apparatus, comprising:

a working station;

an assembly member located on said working station, having a plurality of holes penetrating said assembly member;

a container disposed on a first side of said assembly member, accommodating a plurality of pins each having two open ends coupled by a bent portion with the bent portion located opposite from said open ends, the hairpins arranged within said container in an array comprised of a plurality of rows;

a guide plate positioned on said first side to receive the pins from said container with the pins held in alignment by said guide plate in alignment with said plurality of holes;

a guiding unit disposed on a second and different side of said assembly member, having a plurality of guide rods moving between a first position and a second position, and inserting said guide rods into one side of said assembly member through corresponding ones of said holes while moving from said first position to said second position with distal ends of said guide rods protruding from said first side of said assembling member via said holes while in said second position; and a pushing unit disposed on said first side of said assembly member, having a plurality of push rods each contacting a corresponding bent portion of different ones of the pins received by said guide, with said guide rods in said second position contacting the open ends of the pins, and simultaneously pushing the pins through said holes while said guide rods move from said second position to said first position through said holes.

10. The apparatus of claim 9, further comprised of a clamping unit disposed on said working station, said clamping unit comprising a fixing member and a moving member each positioned on opposite sides of said assembly member, said moving member pushing said assembly member against said fixing member.

11. The apparatus of claim 9, further comprised of a a rounded groove formed on said push rods, having a shape corresponding to an outer circumferential rounded surface of said bent portion of said pins.

12. The apparatus of claim 11, further comprised of a pin positioning unit, said container disposed on said pin positioning unit to supply said pins to said positioning unit.

13. The apparatus of claim 9, with said guiding unit comprising a tip formed on each of the guide rods, said tip having a shape of a cone, a top portion of said tip being inserted into an open end of the corresponding pin while a bottom portion of said tip is not inserted into said opening of the pin.

14. The apparatus of claim 9, with said guide rods of said guiding unit having a diameter smaller than a diameter of said holes of said assembly unit.

15. The apparatus of claim 9, with said assembly member comprising first and second side panels and a plurality of flat plate fins disposed between said first and second side panels.

16. An automatic assembling apparatus for a heat exchanger, comprising:

a working station;

an assembly member having first and second side panels disposed to hold a plurality of flat plate fins between said first and second side panels, locating a central portion of said frame, having a plurality of holes formed in a configuration on said first and second side panels and said flat plate fins;

a container accommodating a plurality of pins each having two open ends joined by a bent portion having a rounded surface, with said pins arranged in said container in an array formed by a plurality of spaced-apart rows and discharged seriatim from said rows;

a guide positioned to maintain the pins discharged from said rows in an alignment with said configuration;

a hair pin guiding unit located on said working station and one side of said assembly member by a predetermined distance from said assembling member, having a guide rod moving between a first position and a second position and being inserted through said holes while moving from said first position to said second position, contacting corresponding open ends of the pins; and a hair pin pushing unit, having a plurality of push rods simultaneously inserting said open ends of the pins maintained by the guide into said holes of said assembly member by pushing said push rods against said assembly member while said guide rods move from said second position to said first position.

17. The apparatus of claim 16, further comprised of a clamping unit installed on said working station, clamping both sides of said assembly member.

18. The apparatus of claim 17, further comprised of the guide being installed between said assembly member and said hair pin pushing unit on said working station, supporting and positioning the pins to be accurately inserted into said holes as said hair pin pushing unit pushes pins through said holes.

19. The apparatus of claim 16, with said hair pin pushing unit comprising:

third and fourth rails installed in a predetermined interval at the other side of said working station;

fourth cylinder coupled to an outer peripheral surface of thread portion of said third rail, horizontally moving along said third rail; and a connector having a middle part fixed at one end of said fourth cylinder and both ends connected to an outer peripheral surface of said fourth rails, horizontally moving along said fourth rails, wherein one ends of said push rods contacts bent portions of said hair pins positioned between said assembling member and said hair pin pushing unit.

20. The apparatus of claim 19, further comprised of a hair pin supporting unit installed between said assembly member and said hair pin pushing unit on said working station, supporting and positioning said hair pins so as to be accurately inserted into said holes during pushing said hair pins by said hair pin pushing unit, having first and second grooves forming two horizontal rows.

21. The apparatus of claim 16, further comprised of a hair pin supplying unit installed between said hair pin pushing unit and said assembly member and accumulating and supplying said hair pins, including:

a plurality of upper and lower rails fixed at a predetermined position of said working station with the same height;

a top panel fixed on said upper and lower rails, maintaining said upper and lower rails in parallel;

a pair of first cylinders fixed via a bracket in said upper and lower rails;

an accumulating container having lower ends coupled with rods of a pair of cylinders, accommodated in spaces divided by the upper and lower rails and top panel, vertically accumulating said hair pins within each space;

a pair of second cylinders respectively installed on said upper and lower rails, moving up and down along said upper and lower rails;

a pushing pad having both ends horizontally connected to said second cylinders, giving a pressure on said hair pins accumulated in said spaces, positioning said hair pins located at a bottom of said space; and pairs of elastic members formed on lower open portions of said spaces, holding and supporting said hair pins accumulated at said spaces by elasticity, preventing natural drops by gravity.

22. The apparatus of claim 21, with said hair pin supplying unit comprising:

a wall vertically installed on said work station;

an open portion formed on said wall, said hair pins accumulated in said space through said open portion; and a pair of slots formed on said wall, accommodating insertion of both ends of said push pad, maintaining said push pad in horizontal balance, and allowing said push pad to move up and down while said both ends of said push pad are inserted into said slots.

23. The apparatus of claim 21, with said hair pin supplying unit comprising a plurality of cushioning members disposed between said push pad and said second cylinders.

24. The apparatus of claim 16, a hair pin guiding unit located on said working station and one side of said assembly member by a predetermined distance from said assembly member, having a guide rod moving with said hair pin guiding unit comprising:

first and second rails installed in a predetermined interval at one side of said working station;

a third cylinder coupled to an outer peripheral surface of a threaded portion of said first rail, horizontally moving along said first rail;

a connecting member with a middle part fixed at one side of said third cylinder and both ends coupled to an outer peripheral surface of said first rail, horizontally moving along the second rail and maintaining proper balance of said hair pin guiding unit;

moving member with a middle part connected at the other end of said third cylinder, horizontally moving along with said third cylinder;

a pair of upper and lower guide rods horizontally installed at one side of said moving member in a predetermined interval, having a pair of ends inserted through said holes; and a fixing member guiding said guide rods while said guide rods are inserted into said holes.

25. The apparatus of claim 24, with said guide rods comprising a tip formed on said one end of each of said guide rods, said tip having a slanted side at an external diameter and a circular diameter corresponding to the circular diameter of an opening in said hair pins when said guide rod is in second position.

26. The apparatus of claim 24, with said hair pushing unit comprising:

third and fourth rails installed in a predetermined interval at the other side of said working station;

a fourth cylinder coupled to an outer peripheral surface of threaded portion of said third rail, horizontally moving along said third rail; and a connector having a middle part fixed at one end of said fourth cylinder and both ends connected to an outer peripheral surface of said fourth rail, horizontally moving along said fourth rail, wherein one end of said push rods contacts bent portions of said hair pins positioned between said assembling member and said hair pin pushing unit.

27. The apparatus of claim 26, further comprised of a hair pin supporting unit installed between said assembly member and said hair pin pushing unit on said working station, supporting and positioning said hair pins to be accurately inserted into said holes while pushing said hair pins with said hair pin pushing unit.

28. The apparatus of claim 24, further comprised of a hair pin supplying unit installed between said hair pin pushing unit and said assembly member and accumulating and supplying said hair pins, said hair pin supplying unit comprising:
- a plurality of upper and lower rails fixed at a predetermined position of said working station with the same height;
- a top panel fixed to said upper and lower rails, maintaining said upper and lower rails in parallel;
- a pair of first cylinders fixed via a bracket in said upper and lower rails;
- an accumulating container having lower ends coupled with rods to said pair of cylinders, accommodated in spaces divided by the upper and lower rails and top panel, vertically accumulating said hair pins within each space;
- a pair of second cylinders respectively installed on said upper and lower rails, moving along said upper and lower rails;
- a pushing pad having both ends horizontally connected to said second cylinders, imparting pressure on said hair pins accumulated in said spaces, positioning said hair pins located at a bottom of said space; and
- pairs of elastic members formed on lower open portions of said spaces, holding and supporting said hair pins accumulated at said spaces by elasticity.

29. The apparatus of claim 28, with said hair pin supplying unit comprising a plurality of cushioning members disposed between said push pad and said second cylinders.

30. An automatic assembling apparatus for a heat exchanger, comprising:
- a working station;
- an assembly member having first and second side panels and plurality of flat plate fins disposed between said first and second side panels, locating on a central portion of said frame, said assembly member having a plurality of holes formed on said first and second side panels and said flat plate fins;
- a hair pin guiding unit located on said working station and one side of said assembly member by a predetermined distance from said assembling member, having a guide rod moving between a first position and a second position and being inserted through said holes while moving from said first position to said second position, said hair pin guiding unit contacting one end of a plurality of hair pins disposed on the other side of said assembling member in said second position;
- a hair pin pushing unit located on said working station and the other side of said assembling member, having a plurality of push rods contacting the other end of said hair pins, and inserting said hair pins into said holes of said assembling member by pushing said push rod against said assembly member while said guide rods move from second position to said first position; and said hair pin guiding unit comprising:
- first and second rails installed in a predetermined interval at one side of said working station;
- a third cylinder coupled to an outer peripheral surface of a threaded portion of said first rail, horizontally moving along said first rail;
- a connecting member with a middle part fixed at one side of said third cylinder and both ends coupled to an outer peripheral surface of said first rail, horizontally moving along the second rail and maintaining proper balance of said hair pin guiding unit;
- a moving member with a middle part connected at the other end of said third cylinder, horizontally moving along with said third cylinder;
- a pair of upper and lower guide rods horizontally installed at one side of said moving member in a predetermined interval, having a pair of ends inserted through said holes; and
- a fixing member guiding said guide rods while said guide rods are inserted into said holes.

31. The apparatus of claim 30, with said guide rods comprising a tip formed on said one end of each of said guide rods, said tip having a slanted side at an external diameter and a circular diameter corresponding to the circular diameter of an opening in said hair pins when said guide rod is in second position.

32. An automatic heat exchanger assembling apparatus, comprising:
- a hair pin supply vertically and simultaneously discharging a plurality of hair pins from a distributed array comprised of a plurality of discrete rows seriatim from each of said rows;
- a hair pin guide plate oriented on a first side of a space accommodating a stack of fin plates perforated by a corresponding array of openings, positioning the plurality of hair pins discharged by said supply in alignment with said array;
- a guiding unit positioned on a second and opposite side of said space from said guide plate, extending through the openings and aligning distal open ends of hair pins within said row with the openings; and
- a hair pin pushing unit comprising a single contoured side simultaneously pushing return bends of the row of hair pins positioned by said guide plate in said alignment while the open ends of the row of hair pins are individually engaged with said guiding unit, with said contoured side continuously pushing the return bends through the openings and into the stack.

33. The apparatus of claim 32, further comprised of said contoured side bearing a plurality of U-shaped grooves conforming in shape to discrete corresponding ones of the hair pins.

34. The apparatus of claim 32, further comprised of said contoured side continuously pushing the hair pins through the openings and into the stack until distal open ends of the hair pins emerge from said second side.

* * * * *